United States Patent [19]

Eckert et al.

[11] Patent Number: 4,499,537

[45] Date of Patent: Feb. 12, 1985

[54] APPARATUS FOR RAPID EXECUTION OF INTERRUPTS AFTER THE RECOGNITION OF AN INTERRUPT REQUEST

[75] Inventors: Alfred Eckert; Ernst Heilmeir; Klaus Hempen, all of Munich, Fed. Rep. of Germany

[73] Assignee: Siemens Aktiengesellschaft, Berlin & Munich, Fed. Rep. of Germany

[21] Appl. No.: 418,436

[22] Filed: Sep. 15, 1982

[30] Foreign Application Priority Data

Sep. 30, 1981 [DE] Fed. Rep. of Germany ....... 3138961

[51] Int. Cl.³ .............................................. G06F 9/46
[52] U.S. Cl. .................................................. 364/200
[58] Field of Search ......................... 364/200 MS File

[56] References Cited

U.S. PATENT DOCUMENTS

| 3,293,612 | 12/1966 | Ling | 364/200 |
|---|---|---|---|
| 3,373,408 | 3/1968 | Ling | 364/200 |
| 3,668,646 | 6/1972 | Hemdal | 364/200 |
| 3,905,025 | 9/1975 | Davis et al. | 364/200 |

Primary Examiner—Raulfe B. Zache
Attorney, Agent, or Firm—Hill, Van Santen, Steadman & Simpson

[57] ABSTRACT

A method and apparatus for rapid execution of interrupts after recognition of an interrupt request in a processor which has a control unit and an external program memory, provide that the instructions for execution and processing of an interrupt are inserted between the instructions for working off a program, that the instructions are addressed by a plurality of instruction indicators which work and are addressable in parallel, and that the instruction indicators are addressed, on the one hand, by a program and, on the other hand, by recognition of interrupt requests.

4 Claims, 2 Drawing Figures

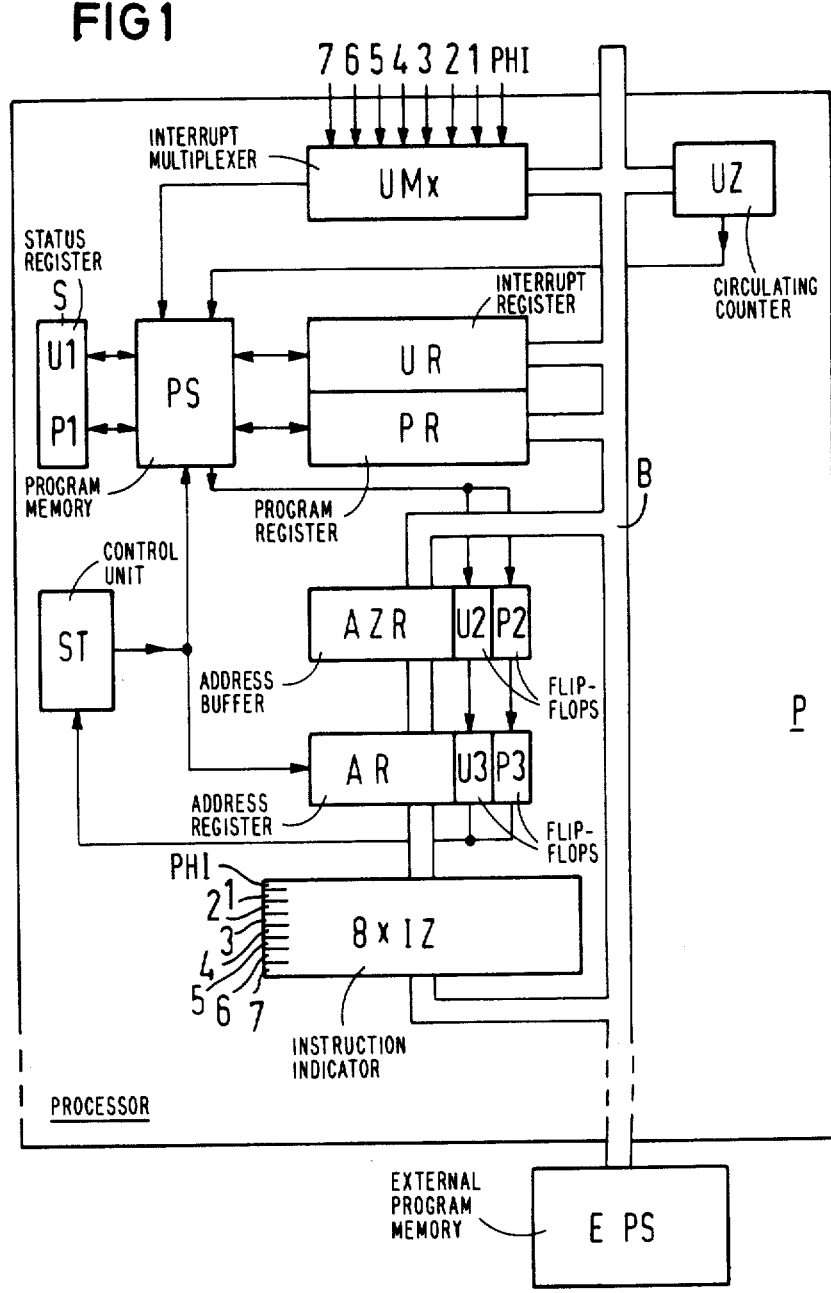

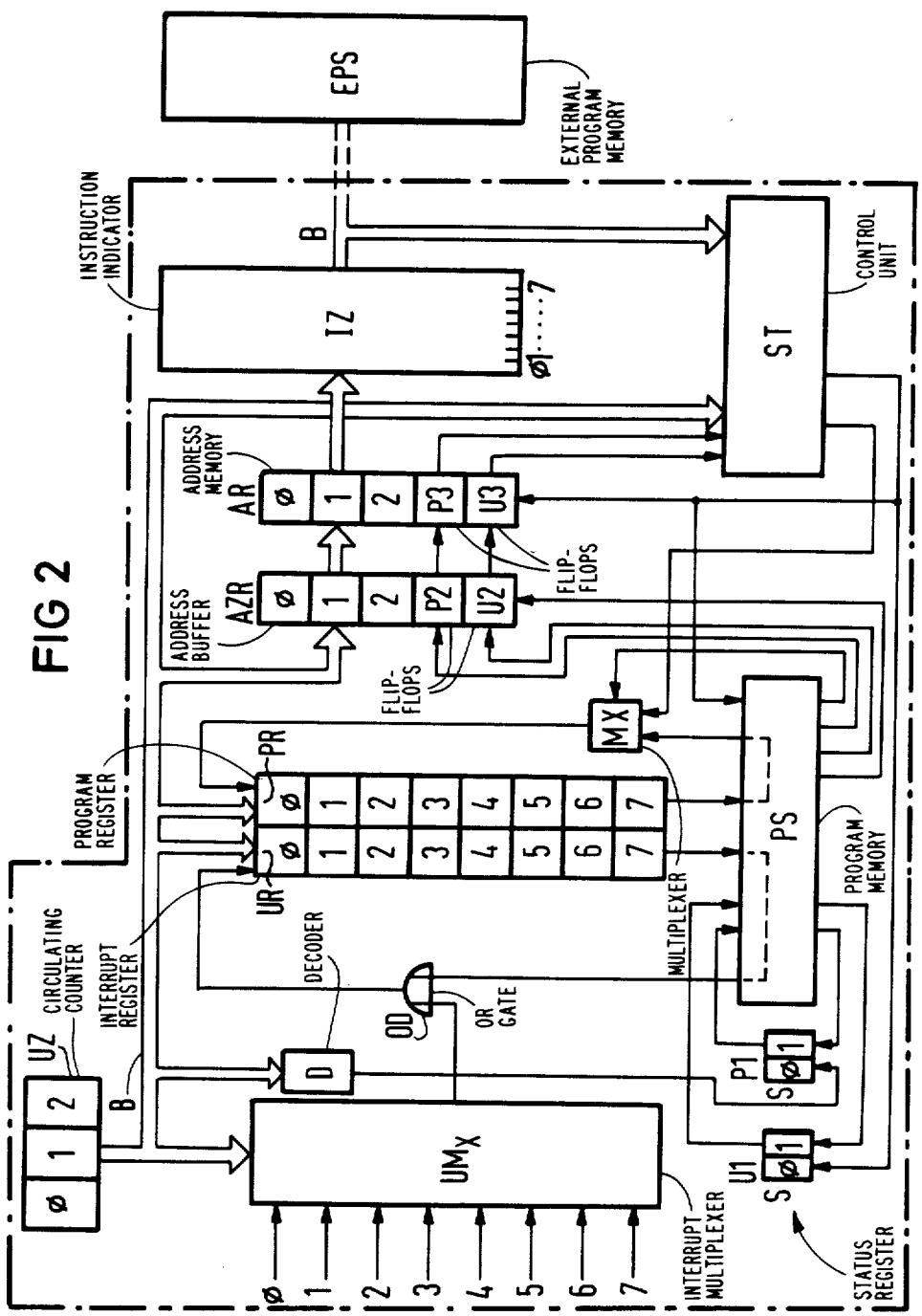

APPARATUS FOR RAPID EXECUTION OF INTERRUPTS AFTER THE RECOGNITION OF AN INTERRUPT REQUEST

BACKGROUND OF THE INVENTION

1. Field of the Invention

The present invention relates to a method and apparatus for rapid execution of interrupts after recognition of an interrupt request in a processor having a control unit connected over a bus and control lines and having an external program memory.

2. Description of the Prior Art

Among other things, processors are employed for controlling writing and printing units. A significant requirement which is made of modern writing and printing units is a high writing speed. As a result, considerable drive problems are placed on the processor for the devices employed as writing and printing units. In this connection, mechanical transducers such as matrix printing heads, stepping motors and the like are a few examples. When, for example, the writing unit contains a matrix printing head with which the characters are printed in a dot matrix in the form of a point grid, then, given a writing speed of 800 characters per second and a print format in which a character can be represented in a matrix with 14 printing columns and 16 points per printing column, the chronological spacing of the printing columns is only approximately 90 $\mu$s. In order to obtain a presentation pattern with good optical qualities, the requirement is made that the offset of the printing matrix points relative to one another in one printing column of a character on the paper must not be greater than ±0.5 mm. Three sub-tolerances which derive from the mechanics of the apparatus, from the amplifier, and from the interrupt execution of the processor, are contained in this overall tolerance of a maximum of ±0.5 mm. The tolerance portion which can be attributed to the interrupt execution amounts to approximately 50% of the overall tolerance. So as not to exceed the offset of the printing matrix points relative to one another within a printing column, given an admissible overall tolerance of ±0.5 mm on the paper, the impression of a matrix printing point given the specified example must have occurred within a chronological tolerance of a maximum of 25 $\mu$s. This means that the interrupt execution, i.e. the data transfer, must be carried out by the processor after recognition of an interrupt request, i.e. in a time span of approximately 12 $\mu$s per printing column. A plurality of interrupt requests can occur at any time within this time span. These could, for example, relate to a motor pulse, to a pulse for the drive of the printing head or a movement of the carriage with which the printing head is moved along the recording medium, and can also relate to interface conditions.

Further, different type fonts, for example bi-directional printing inclined to the left and to the right, wide-spaced lettering, pattern printing, condensed lettering, proportional lettering and the like must be possible with a high writing speed. For the realization of all of these type fonts, it is necessary to print the matrix printing points between the printing columns prescribed by the print format as well. Therewith, the requirements made of a very rapid execution of the interrupt after recognition of the interrupt request are further increased. For example, 14 additional intermediate columns are inserted for printing a bidirectional lettering inclined towards the left or towards the right with a printing matrix head having 14 printing columns per character, the time span for the interrupt execution by the processor being thereby reduced to approximately 6 $\mu$s.

Given traditional processors, an extensive salvage routine of various control parameters is necessary after the recognition of an interrupt request. As a result, a considerable expense of time occurs between the recognition of an interrupt request and the execution of the interrupt, and this is subject to chronological fluctuation as a function of the type of interrupt in the running program. Approximately 40 $\mu$s are required for the so-called skip out of the main program and the return skip into the main program with the standard salvage and reloading routines of relevant control parameters.

Therefore, due to their function structure, traditional processors are not in a position to execute the required interrupts within such short chronological spacings as occur given writing speeds on the specified order. This leads to the fact that the drive of the individual aggregates of the printing unit such as, for example, matrix printing heads, stepping motors having different phase numbers, d.c. motors having timing discs, parallel or serial interfaces, therefore does not occur in a suitable manner with respect to time. A time-suited drive requires that the interrupt must have been executed by the processor in a time span of 6 $\mu$s after the interrupt request. It is only then that a presentation pattern with good optical quality is certain to be achieved.

Up to now, a rapid interrupt execution by traditional processors has only been possible when it is distributed in parallel to a plurality of processors. However, the expense connected therewith is considerable.

SUMMARY OF THE INVENTION

The object of the present invention, therefore, is to provide a method, and an advantageous circuit arrangement for the execution of the method, with which it is possible for a processor to execute interrupts rapidly, i.e. while observing the above-specified time conditions after an interrupt request.

The above object is achieved, according to the present invention, in that the instructions for the execution and processing of an interrupt are inserted between the instructions for working off a program, in that the instructions are addressed by a plurality of instruction indicators which work and which are addressable in parallel, and in that the instruction indicators are addressed, on the one hand, by a program and, on the other hand, by recognition of interrupt requests.

Also according to the invention, a particularly advantageous circuit arrangement is characterized in that a plurality of instruction indicators working and addressable in parallel are provided and that lines for interrupt request are connected to the inputs of an interrupt multiplexer. A circulating counter cyclically forms the addresses of the inputs and searches the interrupt multiplexer for set interrupt request. An interrupt register is provided into which interrupt requests found under a specific address are written as bits in a level of the interrupt register which is determined by the address. A program register is provided in which bits are set and erased by instructions from a program located in an external program memory. The circulating counter of the interrupt register and the program register searches for set bits as a function of the status indicated by a status register. The address in the circulating counter under which a bit has been found is written into an address buffer register, and the address residing in the address buffer register is transferred to an address register at the end of each completion of an instruction by the processor. One of the instruction indicators is addressed by the address residing in the address register. A program memory controls the circuit arrangement.

With the arrangement set forth above it becomes possible to arrest a running, current program for only a maximum of 5 μs for the execution of an interrupt. This is the time span from the recognition of the interrupt request up to the end of the data transfer. The individual devices of a writing and printing unit can now be driven in a time-suited manner even given high printing speeds, i.e. a data transfer can be executed quickly and in a time-suited manner.

A further advantage is that the insertion of instructions into the program sequence can also be employed for other functions within the processor.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a block diagram representation of a circuit arrangement for executing the method of the present invention; and FIG. 2 is a more detailed circuit diagram of a circuit arrangement for carrying out the method of the present invention.

DESCRIPTION OF THE PREFERRED EMBODIMENTS

FIG. 1 illustrates a processor P of which only those components necessary for an understanding of the invention are illustrated. More specifically, and referring to both FIG. 1 and FIG. 2, the processor P comprises a control unit ST and is provided with an external program memory EPS. An interrupt multiplexer UMx, a circulating counter UZ, an interrupt register UR, a program register PR, and address buffer register AZR having two flip-flops U2 and P2, an address register AR having two flip-flops U3 and P3, a program memory PS which contains the control program for the circuit arrangement, a status register S, and an instruction indicator IZ are provided for practicing the invention. The status register S comprises two flip-flops U1 and P1. These circuit components are connected over a bus B and by way of a plurality of control lines.

First of all, the functions of the individual circuit components will be explained.

The circulating counter UZ is driven with a prescribed clock frequency by the system clock (not shown) of the processor P. The circulating counter UZ is a three-bit counter which cyclically forms the addresses zero through seven.

Lines for interrupt request are connected to the interrupt multiplexer UMx at eight inputs 0–7.

The interrupt register UR and the program register PR contain eight levels which are disposed from zero through seven according to descending priorities.

Bits, herein referred to as "P-bits", are set and canceled in the program register PR by the program residing in the external program memory EPS.

The inputs of the interrupt multiplexer UMx are cyclically searched for pending interrupt requests by the circulating counter UZ. When an interrupt request is at one of the inputs, then the same is found under a specific address of the circulating counter UZ. A bit, herein referred to as a "U-bit", is now written into that level in the interrupt register UR which corresponds to the address.

The circulating counter UZ also cyclically searches the levels of the interrupt register UR and of the program register PR for set U-bits or, respectively, P-bits.

When the circulating counter UZ encounters a U-bit in the interrupt register UR under a specific address, then that address is written into the address buffer register AZR. The U-bit in the interrupt register UR is erased and is written into the corresponding level of the program register PR as a P-bit. The flip-flop U belonging to the address buffer register AZR is set to "1".

When the circulating counter UZ encounters a P-bit in the program register PR under a specific address, then this address is written into the address buffer register AZR and the appertaining flip-flop P2 is set to "1".

The status register S indicates various states of the search operation. These are described later in conjunction with the various results of the search operation.

The address buffer register AZR always contains the address of instruction indicator IZ, i.e. the program level of the processor which the processor will work off as the next level. The flip-flops U2 and P2 assigned to the address buffer register AZR serve to indicate whether the address residing in the address buffer register AZR is assigned to an interrupt request (flip-flop U2) or to a programming step (flip-flop P2), and whether the address is valid. When both of the flip-flops U2 and P2 are set to "0", the address residing in the address buffer register UZR is invalid. Writing the address contained in the circulating counter UZ into the address buffer register AZR and setting the two flip-flops U2 and P2 is controlled by the control program located in the program memory PS.

The address register AR always contains the current instruction indicator address of the running program as an address. Two flip-flops U3 and P3 assigned to the address register AR serve to indicate whether the address residing in the address register AR is assigned to an interrupt request (flip-flop U3) or to a programming step (flip-flop P3).

At the end of each instruction executed by the processor, the transfer of the current instruction indicator address together with the U-bit and the P-bit from the address buffer register AZR having the two flip-flops U2 and P2 into the address register AR having the two flip-flops U3 and P3 is enabled by the control unit ST of the processor P as the result of an acknowledgment pulse.

The address buffer register AZR and the two flip-flops U2 and P2 are constructed as a latch, i.e. beginning with the trailing edge of the system clock, the address buffer register AZR and the two flip-flops U2 and P2 are transparent up to the leading edge of the next-successive system clock. This means that, starting with the beginning of the clock cycle, the current instruction indicator address together with the U-bit or, respectively, the P-bit, are ready for transfer into the address register AR and into the two flip-flops U3 and P3.

These measures guarantee that the U-bit or the P-bit is read out of a valid program level of the two registers UR and PR with the corresponding address which resides in the circulating counter UZ, being read for one of the instruction counters IZ for the next, current instruction which is addressed by one of the instruction indicators.

One of the eight instruction indicators, operating in parallel, is addressed by the instruction indicator address located in the address register AR. Each of the instruction indicators always contains the instruction address by means of which the next instruction of the external program memory EPS is addressed as soon as the instruction indicator is addressed. This instruction is then only read into the processor P for working off when one of the two flip-flops U3 or P3 belonging to the address register AR is set to "1".

Referring to FIG. 2, the individual circuit components will be explained in greater detail, whereby, for reasons of clarity, the circuit components are described as individual components. In practical use, however, these components are realized by a processor.

The circulating counter UZ is a commercially available synchronous, incremental counter.

The interrupt multiplexer UMx is a 8:1 multiplexer, for example a multiplexer module such as the one offered by Texas Instruments and identified as No. 74151.

The interrupt register UR and the program register PR are registers having decoders which can be acquired, for example, from Texas Instruments, and have the designation No. 74259.

The address buffer register AZR and the address register AR, together with the appertaining flip-flops U2 and P2, and U3 and P3, are parts of six-bit registers which can be acquired, for example, from Texas Instruments, under the identification No. 74174.

The flip-flops U1 and P1 are commercially available flip-flops. A decoder D is a gate logic circuit which sets the flip-flop P1 to "0" when nothing but "0's" are applied to the input. The program memory PS and the external program memory EPS have, for example, a read only memory (ROM) structure, as is well known in the art.

A multiplexer MX is a 2:1 multiplexer such as is offered, for example, by Texas Instruments under the designation No. 74157. Further, a commercially available OR logic gate OD is provided. Instruction indicators IZ are a component of commercially-available processors.

In the following, the manner of operation of the circuit arrangement is explained with respect to various combinations of program sequences and interrupt requests.

In order to execute an interrupt, additional instructions are inserted into the running, current program. This operation is executed by the transfer of the addressable instruction indicators IZ. These instruction indicators IZ address instructions step-wise in the external program memory EPS which are subsequently read into the processor P for working off the program.

At the beginning of each program sequence, all bits residing in the interrupt register UR and in the program register PR are erased by a reset command and, further, no bits are written in. At the same time, the two flip-flops U1 and P1 of the status register S and the instruction indicator IZ are set to "0".

A P-bit is written by the control program of the program memory PS into the level of the program register PR with the highest priority (priority level zero), so that the program can be started. After removal of the reset command, the status register S indicates the status "search U-bit and P-bit" as a result of the two flip-flops U1 and P1 set to "0".

When the circulating counter UZ encounters a U-bit or a P-bit in the interrupt register UR or in the program register PR, the corresponding flip-flop U1 or P1 of the status register S is set to "1" and, therefore, the further search operation for the corresponding bit is inhibited.

Given overflow of the circulating counter UZ from the address seven to the address zero, the flip-flop of the status register S is set to "0" when a U-bit was not previously encountered in the interrupt register UR and the search operation for U-bits and P-bits begins again with the address zero. When a U-bit is previously encountered in the interrupt register UR, then the search operation begins with the address zero only after the acknowledgment pulse from the control unit ST, i.e. the acknowledgment pulse must have occurred before the overflow of the circulating counter UZ.

The current program level in the program register PR is characterized in that, upon the occasion of the first P-bit encountered beginning with the level zero, the address residing in the circulating counter UZ is written into the address buffer register AZR as the current instruction indicator address. The flip-flop P2 belonging to the address buffer register AZR and the flip-flop P1 of the status register S are thereby simultaneously set to "1". The status register now indicates the status "P-bit found, seek U-bit". The flip-flop P2 set to "1" indicates that the address residing in the address buffer register AZR is valid and that it corresponds to a programming step.

When, given a further forward counting up to the address seven, the circulating counter UZ has not found a U-bit in the interrupt register UR, then the flip-flop P1 is reset to "0" given overflow from the address seven to the address zero. The search for U-bits and P-bits is now reenabled.

When the circulating counter UZ has encountered a U-bit in the interrupt register UR by further forward counting beginning with the address under which a P-bit has already been found in the program register PR up to the address seven, then the address residing in the circulating counter UZ is written into the address buffer register AZR as a current instruction indicator address. The U-bit found in the interrupt register UR is erased and is replaced by a P-bit by re-inscription into the same level of the program register PR. The flip-flop U2 belonging to the address buffer register AZR and the flip-flop U1 of the status register S are thereby simultaneously set to "1". (The flip-flop P1 is already set to "1"). The status register S now displays the state "U-bit found, stop, wait for acknowledgment". The flip-flop U2 set to "1" indicates that the address residing in the address buffer register AZR is valid and that it corresponds to an interrupt request.

The same operation sequences when, as a result of the forwarding counting of the circulating counter UZ, a U-bit has been found in the interrupt register UR without a P-bit having previously been found in the program register PR. The status register S also indicates the state "U-bit found, stop, wait for acknowledgment" when only the flip-flop U1 is set to "1".

The two flip-flops U1 and P1 of the status register S remain in the state "U-bit found, stop, wait for acknowledgment" (U1="1" or U1 and P1="1"), until the acknowledgment pulse is output by the control unit ST of the processor P. The state "U-bit found, stop, wait for acknowledgment" is likewise not abandoned before the acknowledgment pulse, even given an overflow of the circulating counter UZ from the address seven to the address zero, i.e. the flip-flop P1 set to "1" is not set to "0" previously.

When a U-bit in the interrupt register UR and a P-bit in the program register PR are simultaneously found, i.e. when both bits are found by the circulating counter UZ under the same address, then the P-bit has the higher priority. This results in the fact that the address with the P-bit residing in the circulating counter UZ is first written into the address buffer register and the flip-flop P2. The U-bit is then erased and replaced by a P-bit in the same level of the program register PR. At the same time, the address with the U-bit residing in the circulating counter UZ is written into the address buffer register AZR and and into the flip-flop U2.

The acknowledgment pulse which is output by the control unit ST of the processor B and which indicates the end of the working off of an instruction in the processor, effects that the instruction address residing in the address buffer register AZR is written into the address register AR. At the same time, the two flip-flops U3 and P3 belonging to the address register are set to the values of the flip-flops U2 and P2 belonging to the address buffer register AZR. The flip-flop U1 in the status register S is reset to "0" by the acknowledgment pulse, as a result of which the search operation for U-bits is again released beginning with the address then residing in the circulating counter UZ.

Given overflow of the circulating counter UZ from the address seven to the address zero, the flip-flop P1 is also reset to "0". The search for U-bits and P-bits is now enabled. The instructions read into the processor P are begun to be worked off with the beginning of the clock cycle and, at the same time, the read-in of the next instruction into the processor P from the external program memory EPS begins. This instruction which is read at the next instruction address is always addressed by the instruction address residing in the current instruction indicator IZ. The current instruction indicator is determined by the instruction indicator address residing in the address register AR. After the next instruction has been read, the instruction indicator address in the current instruction indicator IZ is increased by one. When U-bits and P-bits are no longer set in the interrupt register UR and in the program register PR, then the instruction indicator address most recently written into the address buffer register AZR remains stored there. The flip-flop U2 and P2 belonging to the address buffer register AZR are set to "0" by the control program residing in the program memory PS. It is thereby indicated that the address residing in the address buffer register AZR is not valid.

When P-bits are always found in the program register PR in the same level, i.e. are formed with the same address residing in the circulating counter UZ, then the address residing in the address buffer register AZR is always overwritten with the same instruction indicator address. This occurs until a P-bit is found in the program register PR in a level having higher priority.

The interrupt, i.e. the data transfer, is executed by an instruction indicator IZ which was addressed by the U-bit in the interrupt register UR. A program for processing the interrupt in the processor P is started by the P-bit which is written into the level of the program register PR in which the U-bit was found in the interrupt register UR.

The P-bits in the program register PR are worked off in this sequence of their priority. When a plurality of U-bits are set in the interrupt register UR, then these are worked off independently of their sequence.

The U-bits or, respectively, P-bits are set in the interrupt register UR or, respectively, in the program register PR independently of the status of the status register S.

The plurality of inputs of the interrupt multiplexer UMx and, as a result thereof, the plurality of levels of the interrupt register UR and of the program register PR, as well as the address scope of the circulating counter UZ, are here specified as eight by way of example. A larger or smaller plurality, of course, can also be realized with a circuit arrangement constructed in accordance with the present invention.

A circuit arrangement operating in parallel is also possible instead of the exemplary embodiment set forth above which operates sequentially. In the parallel circuit arrangement, the interrupt requests pending at the inputs would simultaneously address the instruction indicator IZ over a logic circuit constructed of gates.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A circuit arrangement for the rapid execution of interrupts after recognition of interrupt requests in a proccessor which comprises a control unit, control lines and a but connected to said control unit and an external program memory connected to said bus and storing an external program and in which instructions for executing and processing interrupts are inserted between instructions for working off a program, in which the inserted instructions are addressed with a plurality of instruction indicators which work in parallel and which are addressable in parallel, and in which the instruction indicators are addressed, on the one hand, by a program and, on the other hand, by recognition of interrupt requests, comprising:

an interrupt multiplexer connected to said bus and including inputs for receiving interrupt requests;

a circulating counter connected to said bus and operable to form addresses of said inputs and search said interrupt multiplexer for set interrupt requests;

a multilevel interrupt register connected to said bus for storing interrupt requests under specific address as U-bits in a level determined by the address;

a program register connected to said bus for storing and erasing P-bits in response to instructions of the external program in said external program memory;

a program memory connected to said program register and to said interrupt register and storing an internal program for controlling the operation of said circuit arrangement;

status register means connected to said control unit, to said circulating counter and to said program memory and operable to indicate the operational states of the search operation;

means connected to said status register means and including said circulating counter, said interrupt register and said program register, operable to search for set U-bits and P-bits as a function of the states of said status register means;

an address buffer connected to said bus and operable to store circulating counter addresses in response to the finding of U-bits and P-bits;

an address register connected to said address buffer for storing the address stored in the address buffer at the end of each instruction worked off by said processor; and instruction indicator means connected to said bus and to said address register for providing parallel instruction indicators to said external program memory in response to the current address in said address register.

2. The circuit arrangement according to claim 1, wherein:
said status register means comprises two flip-flops.

3. The circuit arrangement according to claim 1, wherein:
said address buffer and said address register each have two flip-flops assigned thereto for storing U-bits and P-bits, respectively.

4. The circuit arrangement according to claim 1, wherein:
said program memory comprises a read-only memory.

* * * * *